Figure 1:
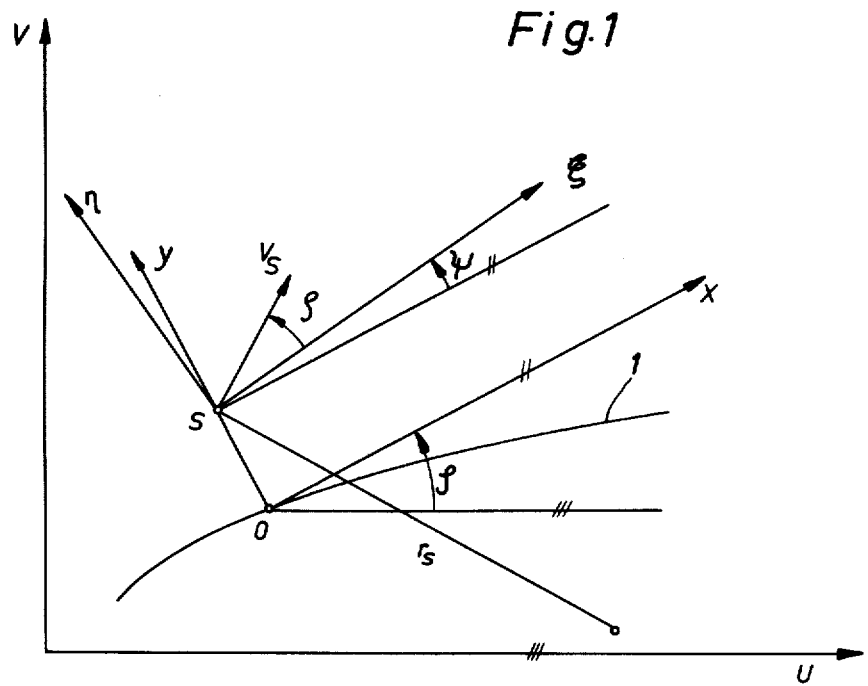

United States Patent [19]

Mank et al.

[11] 4,310,789
[45] Jan. 12, 1982

[54] VEHICLE WHICH IS STEERABLE ALONG A GUIDE WIRE LYING IN THE GROUND

[75] Inventors: Klaus-Dieter Mank, Norderstedt; Günther Prömmel, Kisdorf, both of Fed. Rep. of Germany

[73] Assignee: Jungheinrich Unternehmensverwaltung KG, Hamburg, Fed. Rep. of Germany

[21] Appl. No.: 140,479

[22] Filed: Apr. 15, 1980

[30] Foreign Application Priority Data

Oct. 12, 1979 [DE] Fed. Rep. of Germany ....... 2941507

[51] Int. Cl.³ ............................................. G05D 1/00
[52] U.S. Cl. .................................... 318/587; 180/168
[58] Field of Search ............... 318/587; 180/168, 167, 180/169

[56] References Cited

U.S. PATENT DOCUMENTS

Re. 30,492  1/1981  Blakesee ............................ 180/168
3,748,564   7/1973  Ohba ................................. 318/587
4,079,801   3/1978  Dobson ........................... 318/587 X
4,253,541   3/1981  Lida et al. .......................... 180/168

Primary Examiner—B. Dobeck
Attorney, Agent, or Firm—Toren, McGeady & Stanger

[57] ABSTRACT

A sensor array which extends only over a fraction of the length of the vehicle generates pick-up signals in response to signals emitted by a ground wire lying in the ground. The pick-up signals are processed in signal-processing circuits to generate a heading signal and a displacement signal representing the position of the vehicle and the direction of its longitudinal axis relative to the guide wire. A curvature detector is provided for generating a curvature signal, which represents the curvature of a bend of the guide wire near the sensor array. The heading, displacement and curvature signals are combined by a signal-combining circuit, which delivers a position control signal to position control means for controlling at least one steerable wheel of the vehicle so as to steer the latter along the guide wire.

14 Claims, 10 Drawing Figures

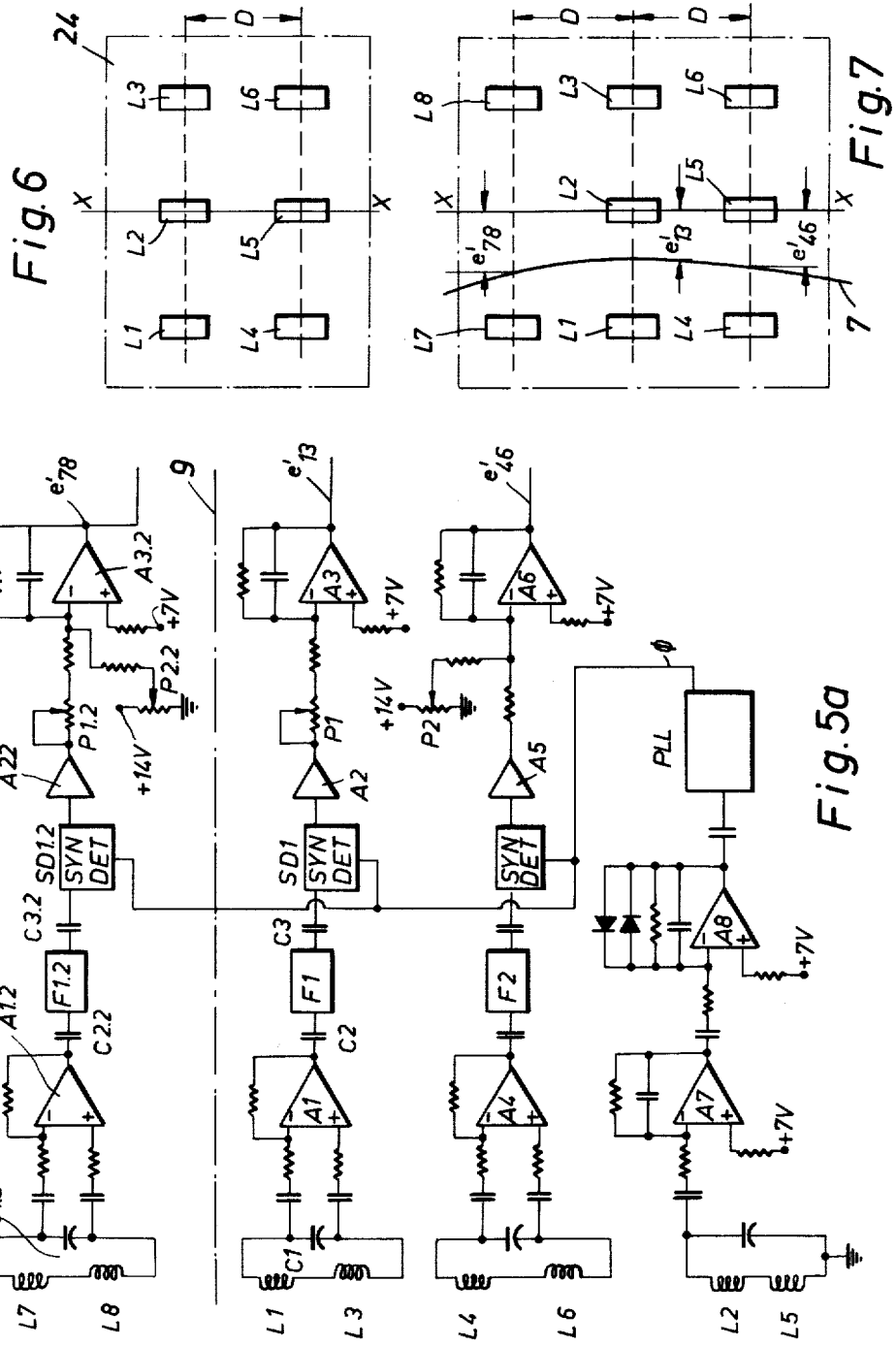

VEHICLE WHICH IS STEERABLE ALONG A GUIDE WIRE LYING IN THE GROUND

This invention relates to a system for steering a steerable vehicle along a guide wire lying in the ground, comprising a sensor, which is fixed to the vehicle and comprises two pickups, which may comprise pairs of coils and are aligned with each other and spaced apart and extend on opposite sides of the longitudinal center line of the vehicle, and two signal-processing circuits, each of which succeeds one of said pick-ups and which are adapted to deliver respective control signals for controlling the steering system of the vehicle, namely, a control signal representing the angle between the longitudinal center line of the vehicle and the guide wire near the sensor and a control signal representing the lateral displacement of the longitudinal center line of the vehicle near the sensor from the guide wire, and a control system which is adapted to receive the combined signals and to control the steering of at least one steerable drive wheel of the vehicle.

An electrical a.c. signal is supplied to the guide wire so that a field is established around the wire and is received by the pick-ups and converted by said pick-ups into a signal which is proportional to the lateral displacement from the wire. Each pickup may consist of one coil, which is arranged on the longitudinal center line of the vehicle and or the longitudinal center line of the sensor which is fixed to the vehicle. It is preferred to use for each pickup a pair of coils, which are spaced equal distances apart from the longitudinal center line of the vehicle so that the straight lines connecting the coils of each pair are parallel to each other and intersect the longitudinal center line at right angles thereto. Within the scope of the invention the coils of a pair may extend at an oblique angle to the longitudinal center line.

If the pick-ups are spaced a small distance apart, the length of the sensor will be relatively small relative to the length of the vehicle and will occupy only a small fraction of the length of the vehicle.

The invention is particularly applicable to a vehicle which has near one end a load-carrying axle that is fixed to the vehicle and which has near the other end of the vehicle either a centrally disposed steerable drive wheel or two steerable drive wheels disposed on opposite sides of the vehicle. Such vehicles are known.

European Patent Application No. 0 001 504 discloses a trackless steerable ground vehicle of the type to which the invention relates. That known vehicle comprises a sensor for detecting the lateral displacements of two points of the sensor from a guide wire and for delivering signals representing said displacements into signal-processing circuits, which contain circuitry for generating control signals which respectively represent the lateral displacement and the heading angle of the sensor relative to the guidewire. A combined signal derived from said two control signals is delivered to the control circuit for steering the at least one steerable drive wheel.

Such sensor is described in European Patent Application No. 0 001 505 to comprise two pairs of coils for generating said control signals.

Both references identified above describe an embodiment comprising a third pair of coils, which does not generate the above-mentioned control signals but has coils which extend on the longitudinal center line of the sensor between the coils of the two other pairs and serve only as reference coils. Whereas such reference coils may be used also within the scope of the invention, they are no pick-ups like the abovementioned pairs of coils but are only auxiliary coils extending on the longitudinal center line of the sensor.

Opened German Specification No. 2,521,571 discloses a system for steering a vehicle along a predetermined course. The vehicle comprises two pairs of coils disposed at the front and rear ends of the vehicles, particularly behind the load-carrying axle and in front of the steerable axle, respectively. The coils of each pair are disposed on opposite sides of and spaced equal distances apart from the longitudinal center line of the vehicle and serve also for steering the vehicle or for controlling a control system for steering the steerable wheels. Within the scope of the invention, the pick-ups may consist of such pairs of coils without additional coil means between said sensor coils.

The two systems mentioned first which have been disclosed in the European patent applications have the disadvantage that it is difficult to steer such vehicle satisfactorily along a bend, that the sensor is spaced a large distance from the guide wire in a sharp bend and that the coupling to the guide wire may be lost if the sensor is small. Besides, the vehicle can be kept close to the guide wire only if gains are used which involve a poorly damped handling of the vehicle. As a result, the vehicle can travel along a bend only at low speed. The design disclosed in the above-mentioned opened German specification has the disadvantage that the steering behavior of the vehicle during forward and reverse travel differs because the coil array extends throughout the length of the vehicle so that it would not be proper to say that there is one sensor but there are two sensors, which are disposed at the front and rear ends of the vehicle, respectively, and connected by special circuitry. Another disadvantage of the last-mentioned system resides in that the lateral displacement of the coils from the wire must be large if a loss of the coupling to the guide wire in a bend is to be avoided. That large lateral displacement increases the susceptibility to interference. Such a known system comprises an additional element for detecting the radius of curvature of the guide wire. That additional element comprises a third pick-up consisting of a third pair of coils, which are disposed in the central portion of the vehicle between the pick-ups at the front and rear ends of the vehicle and are symmetrical to the longitudinal center line of the vehicle. The use of that additional element does not eliminate the disadvantages which are due to the large size of the sensor array and whereas it permits the curvature of the guidewire to be detected it is restricted in application because the vehicle can follow the guide wire only with a time lag as the bend of the guide wire can be sensed only in a length section which extends throughout the length of the vehicle. Rapid changes adjacent to the bend will result in influence which cannot be sensed so that that known system also requires the guide wire to be laid in adaptation to the geometry of the vehicle and the requirement to travel along the guide wire imposes a certain restriction to the system although that embodiment can respond to the curvature of the guide wire. Owing to the large distance between the pick-ups, the action of the field established by the guide wire on the pick-ups may be subject to different external influences. In the known arrangement, the vehicle is caused to approach the guide wire in that a reference signal representing a desired steering angle is derived from the signals sensed along the longitudinal center line of the vehicle and is applied as a reference input of the control signal.

Besides, vehicles having a load-carrying fixed axle and a steerable axle present problems during the transition between forward and reverse travels.

Compared to the above, the systems disclosed in the above-mentioned European patent applications afford the advantage that the sensor is small but they have the disadvantage that the ability of the vehicle to travel along a bend in the guide wire is restricted.

In the detailed description of the drawings, the principles of the known systems for steering a vehicle will be explained more in detail. It will then be seen that during a travel along a constant-radius bend of the guide wire a constant reference input is applied or the vehicle is kept at a finite distance from the guide wire when certain values are selected for certain variables.

The application of a reference input involves the disadvantage that the beginning and end of a bend in the guide wire must be detected. An almost sudden application of the reference input will result in a considerable disturbance of the control signal. Above all, a different reference configurations. Even when the sensor is small in size, it is not desirable to select for the sensor a location at which the angle between the vector of the sensor speed and the longitudinal center line of the vehicle differs from zero because in that case the lateral displacement of the sensor from the wire will increase further when the vehicle is displaced parallel to the wire although the lateral displacement of the vehicle from the guide wire has reached a maximum at that time. This will result in unfavorable influences on the stability of the control loops and requires the sensor to be responsive within a much larger range than when that angle is zero.

But in that case a sustained deviation of the lateral displacement of the vehicle from the guide wire cannot be avoided unless a reference input is applied. If that lateral displacement is to be kept small, the stability of the control loop will decrease. In that case too, the vehicle cannot travel along a bend at high speed and the handling will be most unsteady.

The above remarks may be summed up in that the vehicle will move with a large lateral displacement from the guide wire or will move astray in a sharp bend unless a large sensor array is used. If the vehicle is kept close to the guide wire with the known means, the control of the steering system of the vehicle will hunt so that the handling will be unsteady too. This could be avoided by a travel at low speed along a bend. A change of the weighting factors as the vehicle enters and leaves a bend will involve a higher circuit expenditure and sudden changes of the steering angle; such changes can be compensated to some extent only by delay lines but these involve deviations of the beading angle.

It is an object of the invention so to improve a system of the kind stated first hereinbefore that the vehicle can travel along a bend of the guide wire more precisely and more smoothly and that an inexpensive sensor can be used which may be small in size.

In accordance with the invention this object is accomplished in that a third signal representing a controlled variable is generated directly at the sensor, which is small in size, or in a circuit which succeeds the sensor, and is used in said succeeding circuit as a measure of the curvature of the guide wire.

A controlled variable differs from reference input in that the latter is a fixed parameter which depends on the geometry of the vehicle and is used as a desired value and may differ under certain aspects in dependence on the geometry of the vehicle. In the preferred embodiment of the invention, the third signal is generated within a very small space or preferably in the circuit and the need for electrical feedback is eliminated.

For this reason a particularly preferred embodiment comprises circuitry for generating the controlled variable as a derivative of the angle between the longitudinal center line and the guide wire with respect to time and for applying the controlled variable to the primary control signals. Even in very small sections of a bend of the guide wire, such an arrangement can generate a final control signal which causes the vehicle to closely follow the guide wire. It will be particularly desirable, also as regards the design of the signal-processing circuits at the operational amplifier, to provide a differentiating additional operational amplifier, which has an input and an output, said input is connected to a tapped reference signal which depends on the heading angle between the vehicle and the guide wire, and the output is connected to a summing junction for the primary control signals.

In that strictly electrical circuit, a third signal is generated which causes the small-size sensor to steer the vehicle closely along guide wires having any desired curfature so that a stable tracking is accomplished.

The differentiating operational amplifier suitably comprises an inverting input and a non-inverting, which are connected to switches for selectively applying said heading signal to said inverting or said non-inverting input in dependence on whether the vehicle is traveling forwardly or reversely. This feature will afford an additional advantage when the vehicle is reversed. The output of the differentiating amplifier is suitably connected by a high resistance to a terminal to which a primary control signal representing the angle between the longitudinal center line of the vehicle and the guide wire is also applied. The use of such a high resistance affords the advantage that the proportional contribution of the operational amplifier is decreased.

In a preferred arrangement, said summing junction is connected to an input of an additional operational amplifier for generating a combined signal derived from the lateral displacement of the sensor from the guide wire and from the heading angle, said summing junction is connected to series resistors for supplying said primary control signals to said summing junction, and said differentiating operational amplifier is connected to at least one of said resistors.

In a preferred embodiment, a differentiating operational amplifier is connected in parallel to a proportional operational amplifier and the latter is connected between the summing junction and leads which carry a signal representing the angle between the vehicle and the guide wire and the lateral displacement of the sensor from the guide wire. That arrangement represents a relatively simple circuitry with only a few pick-ups for forward travel and reverse travel and, as a result, permits a detection of the guide wire in a very small length for an adaptation to its course.

The object can alternatively be accomplished by an arrangement in which the sensor comprises three closely spaced pick-ups, particularly pairs of coils, the intermediate third pair of coils are aligned with the load-carrying fixed axle of the vehicle and are succeeded by a signal-processing circuit which includes operational amplifiers and a zero adjustment potentiometer connected to the output amplifier. It is known to provide three pairs of coils or pick-ups one behind the other but with a relatively large spacing. The close spacing, particularly from the load-carrying axle of the vehicle, permits the use of a relatively small sensor so that steering commands can be derived from a short section of the guide wire. If the arrays are symmetrical to the load-carrying axle, the handling during forward travel and reverse travel will also be symmetrical. This is not indicated in the state of the art teaching the use of pairs of coils in arrays extending throughout the length of the vehicle. The latter arrangements can be used to solve the problem with restrictions because the action of the sensor involves scanning errors, which are precluded by the preferred embodiment of the invention with a differential operational amplifier. This will afford important advantages also over the use of three closely spaced apart pick-ups. The distance between adjacent rows of coils is suitably less than about 1/10 of the wheelbase of the vehicle.

The invention will now be described with reference to embodiments shown by way of example on the accompanying drawings, in which the theory underlying the invention will be explained first and the invention will then be described with reference to a known circuit arrangement disclosed in the above-mentioned European patent applications. With reference to said circuit arrangement, the new features of the invention will be particularly pointed out.

Figure 2:
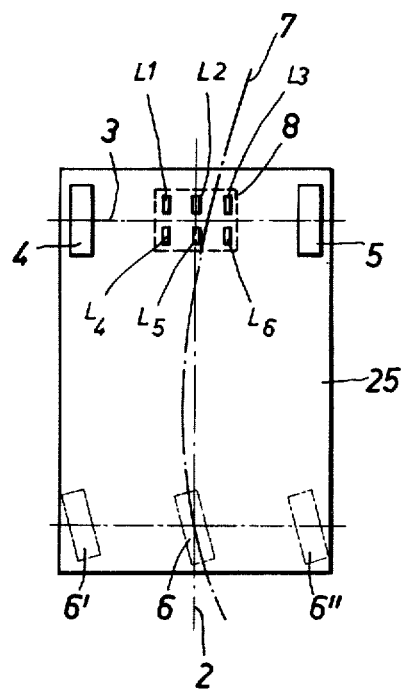
Figure 3A:
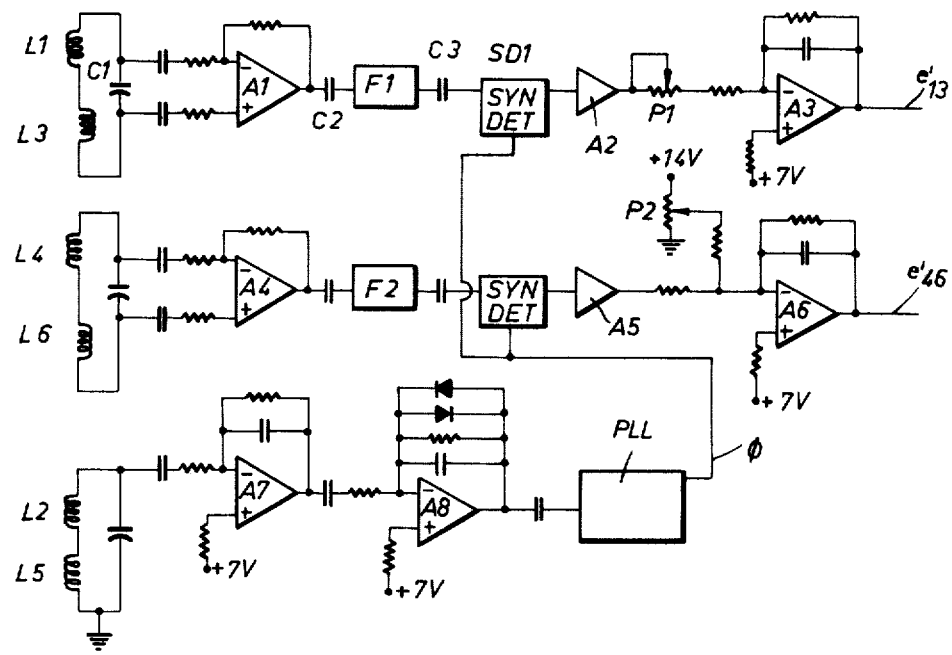
Figure 3B:
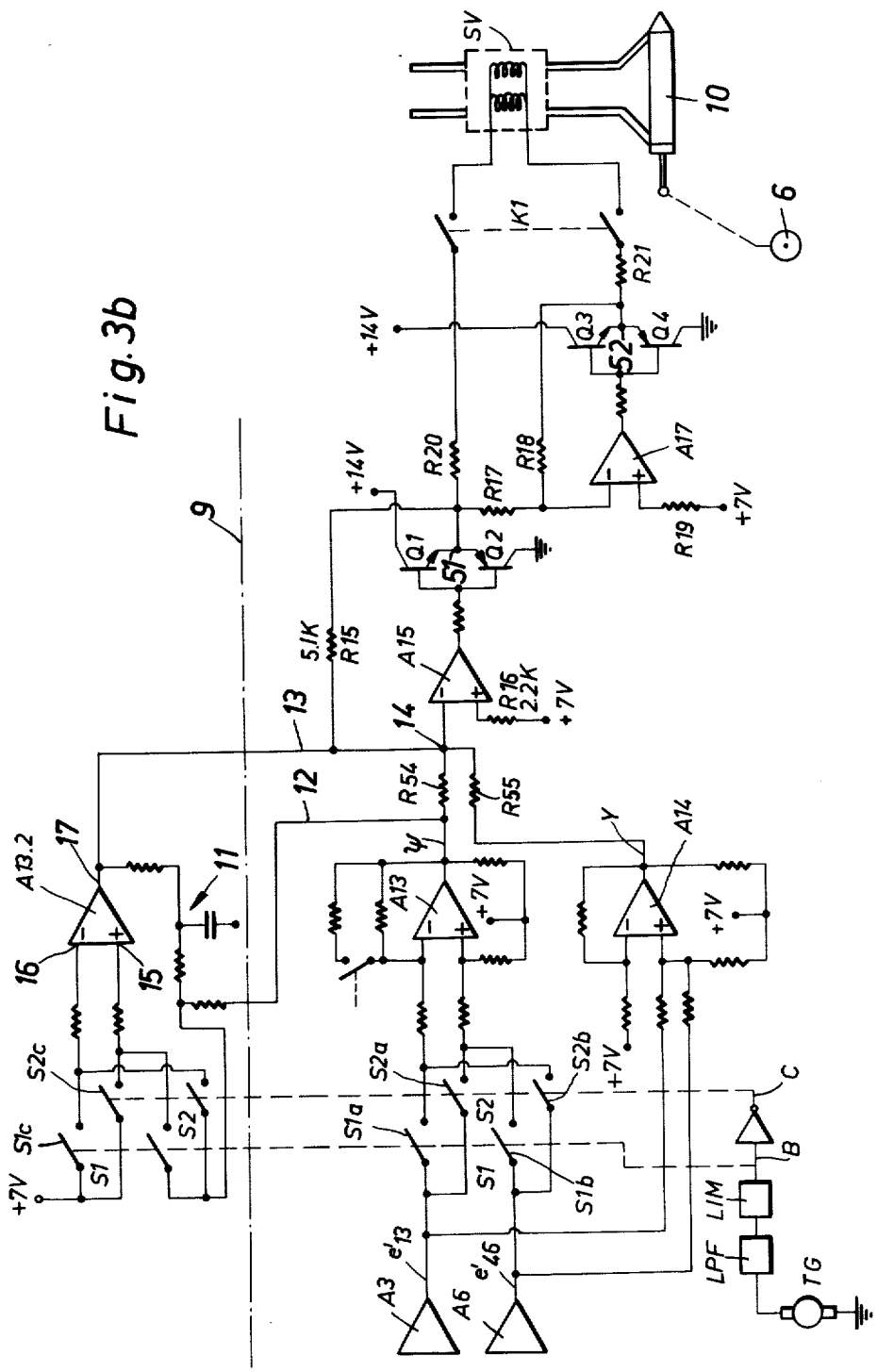
Figure 4A:
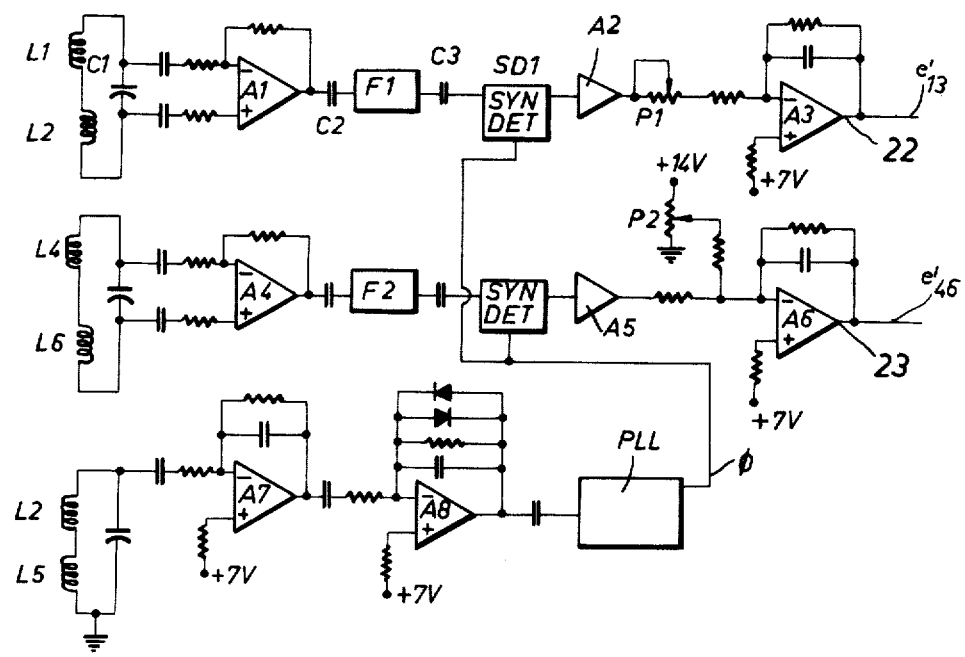
Figure 4B:
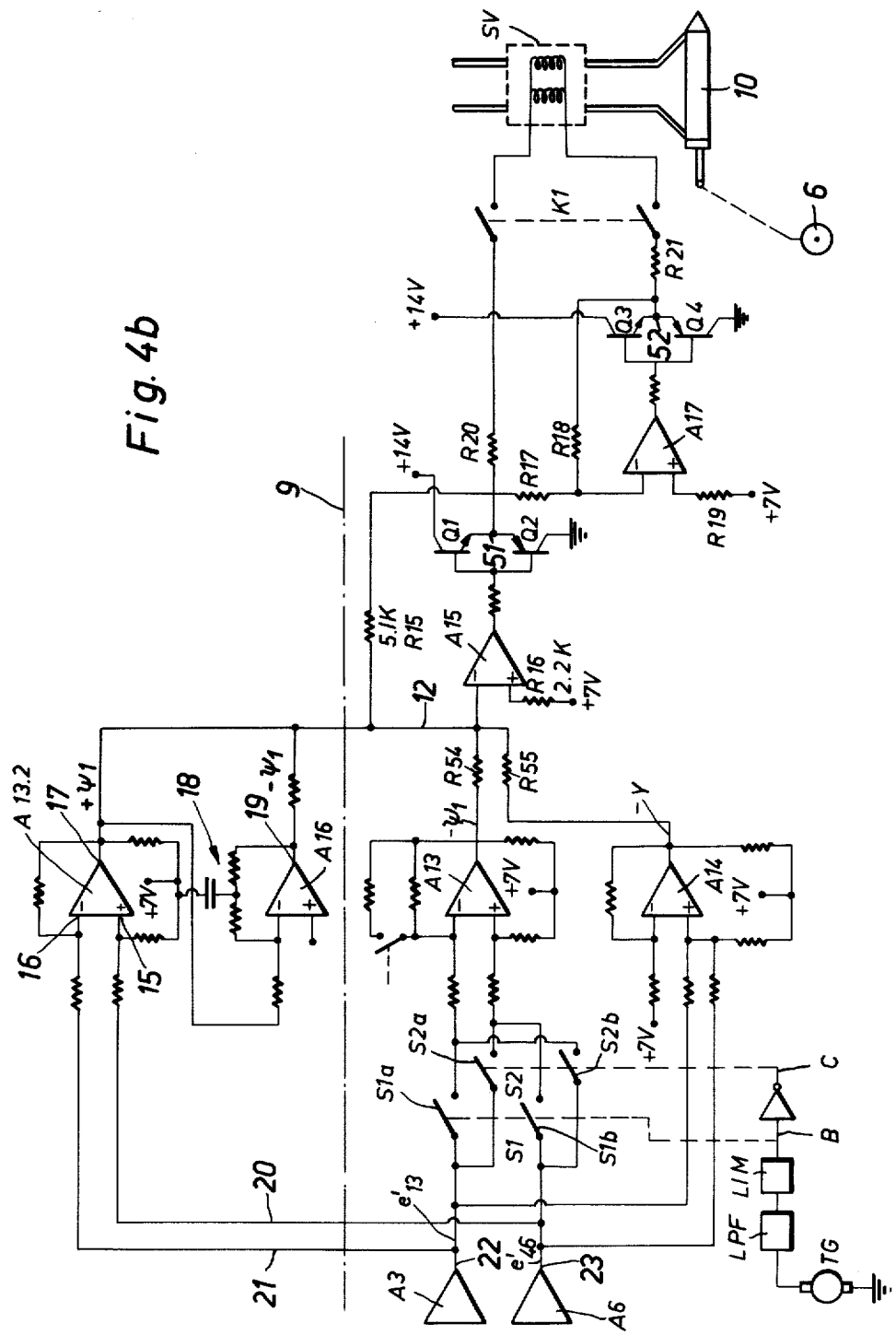
Figure 5B:
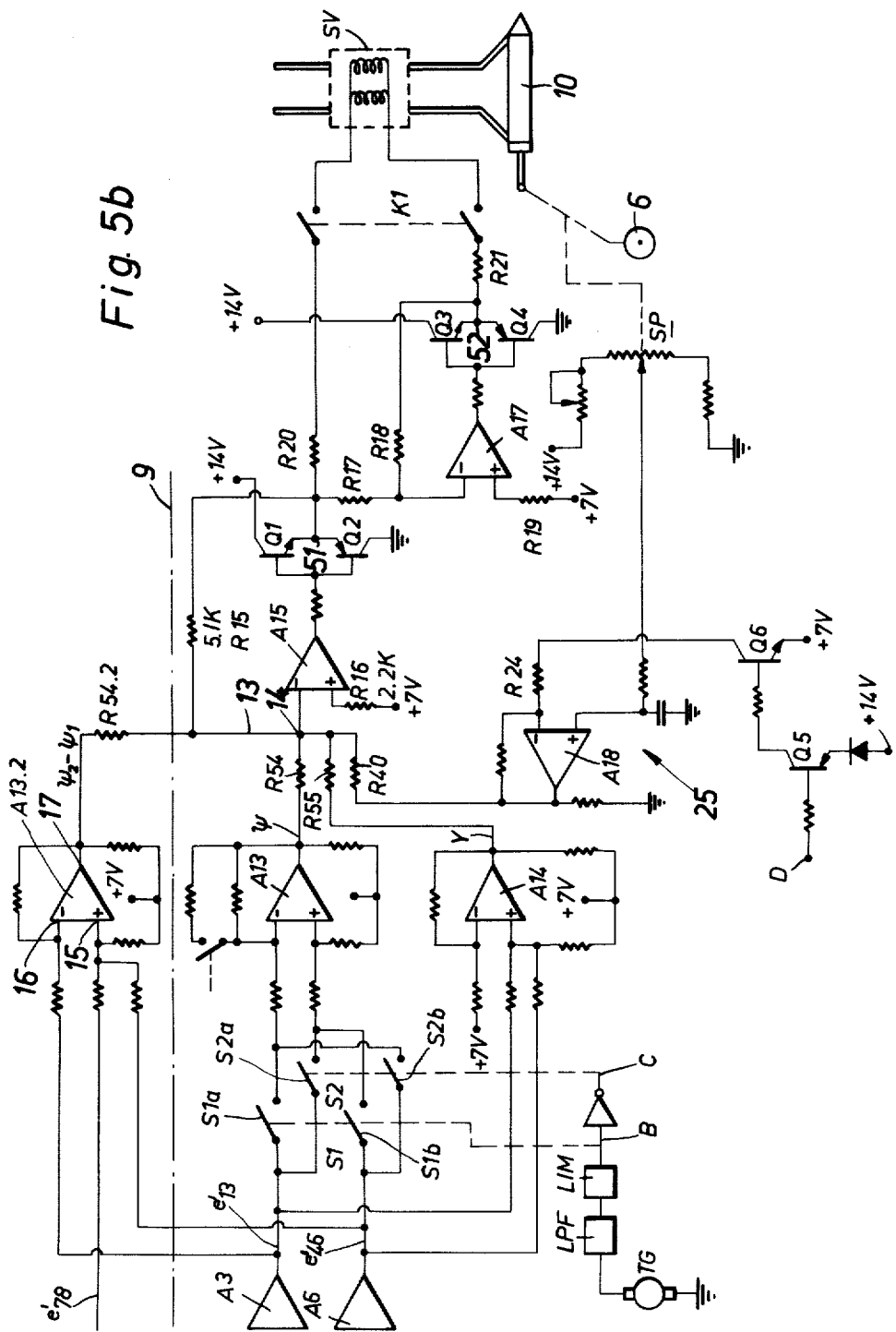

In the accompanying drawings,

FIG. 1 is a diagram for reference in an explanation of the fundamentals underlying the invention, FIG. 2 is a top plan view showing a vehicle and is used for an explanation of various sensor arrays and their functions, FIGS. 3a and 3b, taken together, are a circuit diagram of a preferred embodiment of the invention, FIGS. 4a and 4b, taken together, are a circuit diagram showing an also preferred modification of the preferred embodiment of the invention in a representation similar to that of FIGS. 3a and 3b, FIGS. 5a and 5b, taken together, are a circuit diagram of an embodiment of the invention which affords restricted advantages in a representation which is similar to those of FIGS. 3a, 3b and 4a, 4b, FIG. 6 is a diagrammatic elevation showing pick-ups for the embodiments shown in FIGS. 3 and 4, and FIG. 7 is a diagrammatic elevation showing sensors for the embodiment shown in FIG. 5.

In all Figures of the drawings, like circuit components are designated with the same reference characters.

FIG. 1 shows an inertial coordinate system having axes V and U.

That inertial coordinate system contains another coordinate system having axes X and Y. The origin of the latter coordinate system lies on the guide wire 1 at the point 0 that is nearest to the sensor at a given time. At that point, the axis X is tangential to the guide wire and the axis Y extends at right angles to the guide wire and the axis Y extends at right angles to the axis X through the center of the sensor.

The sensor is diagrammatically represented by a dot S.

The parameters which will be discussed hereinafter and shown in FIG. 1 are defined as follows:

| | |
|---|---|
| $y_s$ | lateral displacement of sensor S from point 0 of guide wire 1, |
| $\psi$ | heading angle between longitudinal center line of vehicle and guide wire |
| $V_s$ | direction of speed vector of sensor in inertial coordinate system UV |
| $r_s$ | direction of vector from the instantaneous pole of a bend of the guide wire to the sensor S |
| $\rho$ | angle between $V_s$ and the longitudinal center line of the vehicle |
| $\phi$ | angle between the axes of abscissae of the inertial coordinate system and the direction of the guide wire at point 0 nearest to the sensor |
| $\xi$ | direction of longitudinal center line of vehicle with sensor at S |
| $\eta$ | coordinate at right angles to direction $\xi$ |
| $g_i,f_i,h_i$ | functions of the variables indicated thereafter in brackets |
| $\bar{f}_i,\bar{h}_i$ | inverse function of $f_i$, $h_i$ |
| $O_i$ | controlled variable, such as steering angle, speed |
| i | $1,2 \ldots \eta$  $1 \leq n \leq 2$ |
| n | number of controlled variables which influence the position of the instantaneous pole |

All coordinate systems are Cartesian systems, right-handed; the angles positive in the left-hand sense.

During straightforward travel, $\rho = 0$.

$$y_s = V_s \sin(\rho + \psi) \quad (1)$$
$$V_s = -r_s(\dot{\psi} + \dot{\rho}) \quad (2)$$

The functions $f_i$ are determined by the steering geometry of the vehicle.

The steering geometry of a vehicle which has an instantaneous pole that is defined by kinematic relationships can be described by the following expression:

$$-\frac{1}{r_s} = \frac{\dot{\psi} + \dot{\rho}}{V_s} = f_i(\rho,\theta) \quad (2.1)$$

i = 1 or 2
$r_s$ = radius of curvature of guidewire

In view of the above, the previously known proportional control functions can be described by the following relationships:

$$\theta_i = h_i(g_i(y, \psi, i, \dot{\psi}, \ldots)) - C_i\theta_1 + W_i) \quad (3)$$

$C_1$ = feedback gain
$W_i = W_i(t)$ = reference input

In the previously built vehicles with automatic steering, $W_i = 0$.

Cornering will be possible if a suitable reference input is applied.

In the functions $h_i$
$h_i(O) = 0$ (only one zero)

$$\frac{dh_i}{d(g_i = C_1\theta_1 + W_i)} \approx \text{constant (in control range)}$$

In function $g_i$,
$g_i(O) = 0$ (only one zero)

$$\frac{\delta g_i}{\delta y^{(j)}} \approx \text{constant}$$

$$\frac{\delta g_i}{\delta \psi^{(j)}} \approx \text{constant}$$

in control range
j = 0, 1, 2 ...

When $\theta_1=0$ (i=1,2) the vehicle moves straight ahead. Without using formulae, it can be stated that functions h and g have only one zero, which is located where the arguments are 0. The functions are approximately linear near that zero.

With stable loops, the described properties of the known control systems result in the following handling of the vehicle:

1. Undisturbed, steady-state travel along a straight guide wire $$\dot{\psi}=0, \; W_i=0, \; \rho \geq 0, \; \theta_i=0$$

All derivatives of the control parameters with respect to time disappear $$\rightarrow g_i(y, \psi)=0 \rightarrow \phi, \; y=0$$

During undisturbed travel, the vehicle follows exactly the straight guide wire.

2. Undisturbed steady-state travel along an arc of a circle $$\dot{\phi}/V_s = H = \text{curvature of guide wire} = \text{constant}$$

All derivatives of the control parameters with respect to time disappear.

In accordance with equation (1), $\phi = -\psi =$ constant $g_i(y,\psi) = C_i\theta_i - W_i$ There are two ways in which vehicle can be steered along a bend having a constant radius:

(a) Application of a constant reference input $$W_i = C_i\theta_i$$

$$\Sigma y, \; \psi=0$$

During undisturbed travel, the vehicle will exactly follow the arc of a circle.

$$W_i=0, \; g_i(y, \psi)=C_i\theta_i \qquad (b)$$

$g_i$ can be selected so that for
 (b.1) $\rho \neq 0, y \neq 0$
 (b.2) $\neq 0, y \neq 0$
 (b.3) $=0, y \neq 0$
the equations $g_i(y, )=C_i\theta_i$ are satisfied.

With $g=0$, the vehicle moves along the guide wire at a finate lateral displacement y.

3. For a varying radius of curvature, the handling can be described as follows when it is assumed that the control response is very fast (very small values of the argument of $h_i$ result in large $\theta_i$):

$$g_i(y,\psi,\dot{y}, \dot{\psi} \ldots)=C_i\theta_i - W_i(t)$$

There are two ways in which the vehicle can be steered along a bend having a varying radius of curvature:

(a) Application of a reference input which changes with time $W_i(t) = C_i\theta_i(t)$ (b) $W_i = 0$, all derivatives with respect to time O. As a result, the same possibilities are available as for the travel through a bend having a constant radius.

As has been explained herein-before, the application of a reference input ($W_i = 0$) is not favorable because different bend configurations require different reference inputs and there will be jerks. The provision of a sensor at a location for which $\rho \neq 0$ is unfavorable too but a location $\rho=0$ will also result in a sustained deviation. For this reason the invention teaches to replace the reference input $W_i$ by controlled variables so that the vehicle can continuously follow a guide wire.

Whereas the above-mentioned opened German specification teaches that a third controlled variable can be used because a third pick-up is provided, that feature involves in the known embodiment the disadvantages that the sensor extends throughout the length of the vehicle so that there is virutually no sensor in the proper sense of the word, i.e., no concentrated, small size sensor which in particular is symmetrical to the load-carrying axle of the vehicle.

The main embodiment of the invention is based on the following considerations:

In view of the geometry of the vehicle:

$$C_i\theta_i - W_i = C_i\left(\bar{f}_i\left(\rho, \frac{\dot{\rho}+\dot{\psi}}{V_s}\right) - \bar{f}_i\left(\rho, \frac{\rho}{V_s}\right)\right) \qquad (4)$$

When linearized with respect to $\dot{\psi}$, the relationship reads $$C_i\theta_i - W_i = C_i \frac{\delta \bar{f}_i}{\delta \dot{\psi}} \bigg/_O \qquad (5)$$

When linearized with respect to $\dot{\psi}/V_s$, the relationship reads $$C_i\theta_1 - W_i = C_i \frac{\delta \bar{f}_i}{\frac{\delta \dot{\psi}}{V_s}} \bigg/_O \bigg/ \frac{\dot{\psi}}{V_s} \qquad (6)$$

Equations (6), (4) and (5) show how the electrical feedback ($C_i\theta_i$) and the reference input $W_i$ can be replaced with advantageous results.

Equations (6) and (5) are simple proportional relationships.

Besides, in the practical application to industrial trucks, it can be assumed that $V_s = V_{s(average)} =$ constant without eliminating the stability of the loop.

FIG. 2 is a diagrammatic top plan view showing a vehicle 1, which has a longitudinal center line 2, a load-carrying axle 3 provided with two wheels 4, 5, and a steerable drive wheel 6, which may be replaced by two steerable driven wheels 6', 6", if desired, as is indicated by dotted lines.

The guide wire 7 is curved adjacent to the vehicle. A sensor 8 is provided, e.g., adjacent to the load-carrying axle and in the present embodiment comprises two pairs of coils L1, L3 and L4, L6, which are spaced equal distances from the load-carrying axle 3. The coils of each pair are spaced the same lateral distance apart. In the present embodiment, the longitudinal center line 2 is also the longitudinal center line of the sensor 8. Two reference coils L2 and L5 are provided on the longitudinal center line 2.

It is apparent that in such an arrangement the lateral displacements of the reference coils L2 and L5 and, for instance, of the coils L3 and L6 can be ascertained from the intensity of the signals which are received by the coils and can be utilized to ascertain the angle of the guide wire adjacent to the sensor and that the distance y travelled by the signal to the longitudinal axis 2 can be ascertained as one-half of the sum of both lateral displacements.

A circuit arrangement will now be described by way of example with reference to FIGS. 3a, 3b, 4a, 4b, 5a, 5b. The lower portion of said circuit arrangement below a phantom line 9 is known from European Patent Application Nos. 0 001 504 and 0 001 505. In accordance with said applications, the sensor 8 comprises pick-ups consisting of pairs of coils, which in the described arrangement consist of pairs of coils L1, L3 and L4, L5 which are spaced from the longitudinal center line, and reference coils L2, L5, which are arranged one behind the other on the longitudinal center line of the vehicle.

Each pair of coils L1, L3 and L4, L6 constitutes an input for a signal-processing circuit. These circuits are highly similar to each other and their output signals combined before they are applied to positioning means for the steerable wheel. A reference voltage is introduced into the circuit arrangement by the reference coils L2, L5.

In the embodiments shown by way of example, coils L1 and L3 are connected in series opposition and by means of a capacitor C1 are tuned to the guidewire signal frequency. A voltage $e_{13}$ which represents the lateral displacement y of the vehicle from the guide wire is applied through coupling capacitors and input resistors to a differential operational amplifier A1 and the output voltage of the latter is applied via a coupling capacitor C2 to a filter F1 shown in block form. The output signal of the filter is applied via a coupling capacitor C3 to one input of a conventional synchronous detector SD1, which at another input receives a reference signal, which is derived by the reference coils L2 and L5 as will be described hereinafter. The synchronous detector SD1 comprises a modulator-demodulator integrated circuit and delivers output signal pulses, which have an amplitude that depends on the amplitude of an input signal, and a polarity which depends on whether or not the input signal is in phase with the reference signal. A.c. signal pulses applied to the synchronous detector SD1 are transformed by known circuits to d.c. signals which are proportional to the input signals.

In the signal-processing circuit to be discussed first, which succeeds the coils L1 and L2, the signal pulses are applied via a buffer amplifier A2 and a setting potentiometer P1 for setting the heading angle gain to a lagging proportional amplifier A3, which acts as a low-pass filter and delivers a d.c.- or slowly changing a.c. voltage output signal $e_{13}$, which is proportional in amplitude to voltage $e_{13}$ and has a polarity depending on the phase relationship between $e_{13}$ and the reference signal.

Coils L4 and L6 are also connected in series opposition. The voltage $e_{46}$ induced in said coils is received by a substantially identical signal-processing circuit, which applies a d.c. or a slowly changing a.c. voltage signal $e_{46}$ corresponding to the voltage $e_{46}$ to the proportional amplifier A6, which agrees with the proportional amplifier A3. These two signal-processing circuits differ in that in the circuit succeeding the coils L4 and L6 the setting potentiometer P1 is replaced by a potentiometer P2 for applying an adjustable bias voltage. The potentiometers P1 and P2 may be used to effect small gain changes and to suppress errors which may occur due to component tolerances, mechanical variations etc.

The reference coils L2 and L5, which are not required in a different embodiment, deliver a reference voltage $\phi$ for the synchronous detectors. Coils L2 and L5 are connected in series in a circuit which is tuned by a capacitor. By means of another capacitance-resistance circuit, coils L2 and L5 are connected to a buffer amplifier A7, which is succeeded by a clipping amplifier A8. A pair of diodes are connected in parallel to the amplifier A8 and define a threshold level, at which the output signals of the amplifier A8 are clipped so that a clipped sine wave is obtained, which is at the guide wire signal frequency and approximates a square wave. This clipped sine wave is delivered to a phase-locked loop circuit PLL, which operates as a tracking filter. In the loop circuit PLL, a voltage is generated which depends on the phase angle of the signal from the reference coils and which is used to control a voltage-controlled oscillator incorporated in the loop circuit PLL. The output signal of the loop circuit PLL is a squarewave voltage at the frequency of the signal in the guide wire. As a result, the loop circuit PLL delivers a substantially noise-free signal $\phi$ as a reference signal to the synchronous detectors SD. The squarewave reference signal from the phase-coupled circuit has a constant amplitude through a substantial amplitude range of the signals from the reference coils and is supplied to the synchronous detectors SD in the signal-processing circuits which succeed coils L1, L3 and L4, L6, respectively. All coil pairs are tuned to the same frequency.

The d.c. signals delivered by these synchronous detectors are not effected by a reference signal. A selected bias voltage having a predetermined polarity is applied to part of the succeeding components of the circuitry. Whereas the output voltage of the clipping amplifier A8 has been described as a square wave, said signal will merely approximate a square wave when the peak values of the sum of the voltages induced in the reference coils L2, L5 substantially exceed the threshold level set by the diodes that are connected in parallel to A8. when the vehicle first approaches the guide wire while the voltage $e_{25}$ is small, then the diodes associated with A8 will not clip the voltage and a sine wave will be supplied from a circuit, not shown, so that a control will be enabled also in a phase angle range which indicates an approach.

In accordance with the figures having numbers provided with the character b, the signal-processing circuits deliver their signals to proportional amplifiers having outputs which are connected to the inverting or non-inverting input of an amplifier A 13 by switches S1a, S2a and S1b, S2b, respectively, or vice versa. The switches S1 and S2 will be actuated in dependence on the direction of travel.

A tachometer generator TG is driven in a sense depending on the sense of rotation of the steerable drive wheel of the vehicle and delivers an output signal having a corresponding polarity so that two oppositely acting logic signals for controlling the switches S1 and S2 can be delivered via leads B and C.

Irrespective of the direction of travel, the voltage $e'_{13}$ and the voltage $e'_{46}$ are applied to the same non-inverting input of an amplifier A14.

The voltage signal at the output of amplifier A13 represents the heading angle of the vehicle relative to the guidewire. The voltage signal at the output of the amplifier A14 represents in amplitude and polarity relative to a neutral bias voltage an average lateral displacement y of the sensor assembly from the guidewire.

The direction signal from the amplifier A13 and the displacement signal from the amplifier A14 are summed before their application to a position servomechanism for positioning the steerable wheel 6 at a certain angle. Both signals are applied through resistors R54, R55. In a less significant embodiment shown in FIG. 5, an additional signal may be applied through a resistor R40, which may have the same resistance as the two other resistors. The sum signal is applied to the non-inverting input of the amplifier A15. The two input signals of the amplifier A15 together constitute the command signal for positioning the steerable drive wheel 6.

When the deviations of the heading angle and lateral displacement are zero and the steering angle is zero too, the amplifier A15 will drive the transistors Q1 and Q2 so that their common emitter terminal is at the neutral level and both transistors conduct near the midpoint of the linear portions of their characteristic curves. Resistors R17 and R18 have the same resistance so that the amplifier A17 drives the emitter terminals 52 of the transistors Q3 and Q4 to the internal level. The emitter terminals 51, 52 of the two pairs of transistors are connected by two current-limiting resistors and two contacts of an operational relay K1 to the actuating coil of a servo-valve SV, which controls a hydraulic control system 10, by which the steerable wheel 6 is positioned at an angle.

Reference has been made hereinbefore to the circuit arrangement known from said European patent applications for an explanation of the invention.

In the embodiment shown in FIGS. 3a and 3b, a differentiating proportional amplifier A13.2 is connected by the associated resistance-capacitance circuit 11 to the resistor R54. One lead 12 is connected before the resistor R54 and the other lead 13 is connected behind said resistor to the summing junction 14 for the output signals of the two signal-processing circuits which succeed the pairs of coils L1, L3 and L4, L6, respectively. The inverting and non-inverting inputs 15, 16 of the amplifier A13.2 are connected by respective pairs of additional contacts S1c, S2c of switches S1 and S2 for a changeover in dependence on the direction of travel so that the application of the signal in lead 12 ($-\psi_1$ during forward travel and $+\psi_1$ during reverse travel) to the inputs is properly changed because the change of the signal must not be reflected by the output signal $-\psi_1$ of the amplifier A13.2.

In this arrangement, the curvature of the bend is detected by simple circuitry which permits the use of a simple sensor. To ensure that the proportional contribution of the amplifier A13.2 is small, the resistance R58 in lead 12 is very high. This feature results in an important improvement over the known arrangement. The design of the signal-processing circuits succeeding the respective pairs of coils is shown only by way of example.

In the embodiment shown in FIGS. 4a and 4b, a proportional amplifier A13.2 is coupled to a differentiating operational amplifier A16 by a resistance-capacitance circuit 18 in such a manner that the proportion contribution of the operational amplifier A16 is compensated by the amplifier A13.2 and output signals $+\psi_1$ and $-\psi_1$ appear at the outputs 17 and 19 of the respective amplifiers and are applied to the lead 12 by the resistors shown. In the circuit arrangement shown in FIGS. 4a and 4b, the switch contacts S1c and S1c have been omitted because the inputs 15, 16 of amplifier A13.2 are connected by leads 20, 21 to the outputs 22, 23 of the amplifiers A3 and A5 in the two signal-processing circuits and the signals $e'_{13}$ and $e'_{46}$ appear at said outputs. The amplifier A5 in the signal-processing circuit succeeding the coils L4, L6 corresponds to the amplifier A3 in the signal-processing circuit succeeding the coils L1, L3.

The gains required in the embodiment that has been described can be calculated by means of the above-mentioned equations (4) and (5), respectively, and depend on the steering geometry of the vehicle. In the design of the control system, the non-linear equation (4) can be directly simulated with microprocessors.

The sensor used in both circuit arrangements which have been described is diagrammatically indicated in FIG. 6 at 24 in FIG. 6, where the coils are shown. It will be understood that circuit arrangements in which the reference coils L2 and L5 in the longitudinal center line have been omitted may also be used.

In the circuit arrangements which have been described, the output signal $-\psi_1$ of the amplifier A13 is proportional to the angle between the vehicle and the guide wire and the output signal of the amplifier A14 is proportional to the lateral displacement y of the sensor from the guide wire.

FIGS. 5a and 5b show a circuit arrangement which is similar to the circuit arrangements shown in the previous figures and comprises the coils L1 to L6. For this reason the description need not be repeated. In the present embodiment, the sensor comprises two additional coils L7 and L8, which will be explained with reference to FIG. 7. The curvature of the guide wire can be ascertained in this case by the measurement of three lateral displacements $e'_{78}$, $e'_{13}$ and $e'_{46}$. The suffixes of the voltage signal designations indicate the coils from which the signals originate.

Coils L7, L8 are succeeded by a signal-processing circuit which is similar to the signal-processing circuit succeeding the coils L1, L3 as far as to the amplifier A3, inclusive, from which the output signal $e'_{78}$ is applied to the non-inverting input 15 of the proportional amplifier A13.2. The input 15 is also connected to a bias voltage source. The inputs 15 and 16 of the amplifier A13.2 are also connected by resistors to the outputs of amplifiers A6 and A3, respectively. The signal-processing circuit connected to coils L7, L8 differs from the circuit connected to coils L1, L3 in that a potentiometer P2.2 for zero adjustment is connected to the inverting input of the amplifier A3.2 so that the signal $e_{78}$ is proportional to the lateral displacement of the longitudinal center line x—x (FIG. 7) from the guide wire.

The difference between voltages $e'_{78}$ and $e'_{13}$ is an approximate representation of an angle $\psi_2$ between the line x—x in FIG. 7 and that portion of the guide wire 7 which is disposed between coils L1 and L7. The difference between voltages $e'_{13}$ and $e'_{46}$ is proportional to the angle $\psi_1$ between the line x—x and that portion of the guide wire 7 which is disposed between coils L1 and L4. The difference $\psi_2-\psi_1$ between these angles can then be used as a measure of the curvature of the guide wire $$H = \frac{\delta\alpha}{\delta S} = \lim_{\Delta S \to 0} \frac{\Delta\alpha}{\Delta S} \approx \frac{\Delta\alpha}{\Delta S} \approx \frac{\psi_2 - \psi_1}{2D}$$

wherein D is distance between the pairs of coils L1, L3 and L7, L8 and between the pairs of coils L1, L3 and L4, L6. These distances are preferably equal.

The difference between the angles can be approximately represented by the voltages:

$$\psi_2 - \psi_1 \sim -2e'_{13} + e'_{46} + e'_{78}$$

This summation is effected by the operational amplifier A13.2, the output of which constitutes the third controlled variable which replaces the reference input otherwise required for cornering.

The bias voltage applied in the circuit arrangements as shown may be voltages which are normal in the operation of the circuit arrangement.

In the signal-processing circuit succeeding the coils L7, L8, those components which correspond to components in the signal-processing circuit succeeding the coils L1, L3 are designated with the same reference characters with a succeeding numeral 2.

The circuit arrangement shown in FIGS. 5a, 5b comprises an electric feedback loop for the position of the steerable wheel 6. That feedback loop is generally designated 25 and connected by the resistor R40, which has been mentioned above in connection with FIG. 5. Resistor R40 is connected to amplifier A18, which is fed by a potentiometer SP, which as a steering angle detector delivers a feedback signal representing the steering angle.

What is claimed is:

1. In a vehicle comprising steerable wheel means, position control means for controlling the position of said steerable wheel means to steer the vehicle in response to a position control signal, and a system for generating said position control signal so as to steer the vehicle along a signal-emitting guide wire lying in the ground, said system comprising a sensor array including first and second pick-ups which are fixed to the vehicle and aligned with each other in the longitudinal direction of the vehicle and extend each on both sides of the longitudinal center line of the vehicle and are adapted to generate pick-up signals in response to signals emitted by said guide wire, said system further comprising first and second signal-processing circuits respectively connected to said first and second pick-ups to receive said pick-up signals therefrom, said first signal-processing circuit being arranged to generate a heading signal representing the heading angle between the longitudinal center line of the vehicle and the general direction of a portion of said guide wire near said sensor array in response to said pick-up signals from said first pick-up, said second signal-processing circuit being arranged to generate a displacement signal representing the lateral displacement of the longitudinal center line of the vehicle near said sensor from said guide wire, said system further comprising a signal-combining circuit, which is adapted to receive and combine said heading and displacement signals and to generate said position control signal in dependence on said heading and displacement signals the improvement which resides in that
said sensor array extends only over a small fraction of the length of said vehicle,
said system comprises a curvature detector arranged to generate a curvature signal representing the curvature of a bend of said guide wire near said sensor array, and
said signal-combining circuit is arranged to generate said position control signal in dependence on said heading, displacement and curvature signals when said vehicle is traveling along a bend of said guide wire.

2. The improvement set forth in claim 1, in which each of said first and second pick-ups comprises a pair of coils disposed on opposite sides of and horizontally spaced from the longitudinal center line of said vehicle.

3. The improvement set forth in claim 1, in which said steerable wheel means are drive wheel means.

4. The improvement as set forth in claim 1, in which said curvature detector comprises additional circuitry for generating said curvature signal in dependence on said pick-up signals.

5. The improvement set forth in claim 4, in which said additional circuitry is arranged to generate said curvature signal as a signal which represents the derivative of said heading angle with respect to time.

6. The improvement set forth in claim 5, in which
said signal-combining circuit comprises a summing junction for combining said heading and displacement signals,
said system comprises a terminal for presenting a tapped reference signal depending on said heading signal,
said additional circuitry comprises a differentiating operational amplifier which has an input connected to said terminal, and an output connected to said summing junction.

7. The improvement set forth in claim 6, in which
said differentiating operational amplifier has an inverting input and a non-inverting input,
a direction detector is provided, which is operable to generate a direction signal indicating whether the vehicle is travelling forwardly or reversely, and
said additional circuitry comprises switch means for selectively connecting said terminal to said inverting and non-inverting inputs in dependence on said direction signal.

8. The improvement set forth in claim 6, in which
said signal-combining circuit comprises a second operational amplifier for generating a signal derived from said displacement and heading signals,
said second operational amplifier has an input connected to said summing junction,
said summing junction is connected by two series resistors to said first and second signal-processing circuits to receive said displacement and heading signals therefrom, and
said differentiating operational amplifier is connected to one of said resistors.

9. The improvement set forth in claim 6, in which
said additional circuitry comprises a proportional operational amplifier having an inverting input connected to said first signal-processing circuit, a non-inverting input connected to said second signal-processing circuit, and an output connected to said summing junction.

10. The improvement as set forth in claim 1, in which said curvature detector comprises
a third pick-up incorporated in said sensor array and adapted to generate additional pick-up signals in response to said signals emitted by said guide wire, and
additional circuitry for generating said curvature signal in dependence on said additional pick-up signals.

11. The improvement set forth in claim 10, in which said vehicle has a fixed load-carrying axle,
said first and second pick-ups are disposed on opposite sides of said axle and spaced from it in the longitudinal direction of said vehicle,
said third pick-up is vertically aligned with said load-carrying axle,
said additional circuitry comprises operational amplifiers connected in cascade and including an output amplifier,
said additional circuitry also comprises a potentiometer for zero adjustment connected to said output amplifier,
said additional circuitry is arranged to generate said curvature signal as a signal representing the difference between the angles of said heading angles between said longitudinal center line of said vehicle and the general directions of two portions of a bend of said guide wire near said sensor array, and
said signal-combining circuit comprises a summing junction for combining said heading and displacement control signals and said curvature signal.

12. The improvement set forth in claim 11, in which each of said pick-ups comprises a pair of coils disposed on opposite sides of said longitudinal center line and horizontally spaced therefrom.

13. The improvement set forth in claim 11, in which the distance between said third pick-up and each of said first and second pick-ups in the longitudinal direction of the vehicle is approximately one-tenth of the wheelbase of the vehicle.

14. In a system for controlling the position of steerable wheel means of a vehicle to steer the vehicle along a signal-emitting guide wire lying in the ground by the operation of position control means for controlling the position of said steerable wheel means in response to a position control signal which system is adapted to be carried by said vehicle and comprises a sensor array including first and second pick-ups which are adapted to be fixed to the vehicle so that they are aligned with each other in the longitudinal direction of the vehicle and extend each on both sides of the longitudinal center line of the vehicle and are adapted to generate pick-up signals in response to signals emitted by said guide wire, said system further comprising first and second signal-processing circuits respectively connected to said first and second pick-ups to receive said pick-up signals therefrom, said first signal-processing circuit being adapted to generate a heading signal representing the heading angle between the longitudinal center line of the vehicle and the general direction of a portion of said guide wire near said sensor in response to said pick-up signals from said sensor array in response to said pick-up signals from said first pick-up, said second signal-processing circuit being adapted to generate a displacement signal representing the lateral displacement of the longitudinal center line of the vehicle near said sensor from said guide wire, said system further comprising a signal-combining circuit, which is adapted to receive and combine said heading and displacement signals and to generate said position control signal in dependence on said heading and displacement signals,
the improvement residing in that
the extent of said sensor array in the direction in which said pick-ups are spaced apart is only a small fraction of the length of a vehicle,
said system comprises a curvature detector adapted to be fixed to the vehicle and arranged to generate a curvature signal representing the curvature of a bend of said guide wire near said sensor array, and
said signal-combining circuit is adapted to generate said position control signal in dependence on said heading, displacement and curvature signals when said vehicle is traveling along a bend of said guide wire.

* * * * *